' 3,086,966
2,5-DIMETHYL-2,5-DI(t-BUTYLPEROXY)HEXANE
Orville L. Mageli, Grand Island, and James B. Harrison, Eggertsville, N.Y., assignors to Wallace & Tiernan Incorporated, Newark, N.J.
No Drawing. Filed Dec. 18, 1959, Ser. No. 860,373
3 Claims. (Cl. 260—94.9)

The present invention relates to polyalkenyl compositions capable of being crosslinked, and to a method for crosslinking such materials particularly the polyethylenes.

The present application is a continuation-in-part of Serial No. 836,599, filed August 28, 1959, and of Serial No. 817,094, filed June 1, 1959, by the present applicants.

Heretofore it has been proposed to crosslink polyethylene compositions by the employment of (a) energy bombardment of the polyethylene or by (b) the employment of certain specified peroxy compounds, as for instance special organic hydroperoxides or peroxides.

It was felt that in the employment of the organic peroxy compounds, curing by crosslinking was induced by the production in the reaction environment of free radicals which induced crosslinking by a so-called free radical mechanism.

The desirability of producing crosslinking in polymers which are polyethylene compositions, and related polyalkenyl materials, resides in inducing change in certain of the physical and chemical characteristics of the polymer whereby the solubility of the polymer in solvents is decreased, the thermoplasticity of the polymer suitably reduced and resistance of the polymer to deformation increased. By inducing such changes, the field of use of the polymer is broadened and the characteristics of products formed from the polymer, whether these characteristics be physical or chemical, are enhanced.

In accordance with the broad aspects of the present invention, an organic polyfunctional peroxy compound of relatively large molecular weight is added to the polyethylene composition and crosslinking effected by heating the mixed composition. The specific organic polyfunctional peroxy compound recommended is 2,5-dimethyl-2,5-di(t-butylperoxy) hexane.

It is believed that linear polyalkenyl compositions are effectively crosslinked, in accordance with the present invention, by reason of the fact that the decrease in solubility of the linear polyethylene is substantially directly proportional to the amount of the polyperoxy compound thermally united therewith.

In order to obtain test results showing the relative order of the effectiveness of crosslinking, weighed samples of commercial polyethylene compositions were heated in a chosen solvent in the presence of a specified weight percent of the diperoxy compound, such specified weight percent generally being from about 1% to 10% by weight, based upon the weight of the polyethylene composition, and the mixture heated under specified conditions. The amount of end product insoluble in the solvent was then determined, from which data the degree of crosslinking could be calculated. This is a standard test and is described in J. Polymer Sci. 31, 127 (1958).

The modified test to determine crosslinking, as employed herein, consisted in dissolving, under heating, 10 parts by weight of the polyethylene composition in 35 parts by weight of xylene. When the polyethylene was dissolved in the xylene, the mixture was cooled to about 90° C., the weighed amount of the crosslinking agent then added and the mixture heated upon a hot-plate for about 20 minutes until a gel was produced.

The gel was recovered and cut into small pieces which were then refluxed wtih a measured amount (200 ml.) of xylene, for approximately one hour. The refluxed insoluble residue was then collected and freed of xylene by a slow-moving current of air at room temperature, and weighed. By this quick test the percent of crosslinking agent can be obtained, such percent being obtained by dividing the weight of the dried, insoluble refluxed residue by 10 and multiplying by 100.

The dicumyl peroxide heretofore employed as a crosslinking agent for polyethylene begins to effect crosslinking often during compounding and is not as effective as the 2,5-dimethyl-2,5-di(t-butlyperoxy) hexane. By standard tests, the dicumyl peroxide shows 37% crosslinking as compared with 51% for the crosslinking agent of the present invention.

The polyethylenes, whether of the so-called high pressure-low density type, or low pressure-high density type, are extremely versatile polymeric materials and suitable for many uses by reason of ability to be formed into films and filaments. Additionally, polyethylene may be fabricated by standard procedures and may have included therein many forms of filling materials, some of which are of inorganic origin, as for instance silica, whiting, alumina, and the like, while others may be the standard carbon black.

In the crosslinking of polyethylene, in accordance with the present invention, the polyethylene composition is admixed with the crosslinking agent of the present invention which may be done by employing conventional techniques employed in the elastomer field, as for instance passage through milling rolls or dispersion in conventional type of mixers.

Such admixture of the crosslinking agent with the polyethylene composition may be performed at room temperature or at temperatures somewhat removed from room temperature, but below that at which crosslinking is effected and the polyethylene composition cured, unless the curing and admixture are relatively simultaneous.

The crosslinking agent of the present invention possessing a relatively favorable half-life, the admixing can be performed at moderately elevated temperatures with the advantages attendant upon this type of procedure. After uniform distribution of the crosslinking agent in the polymer, the admixture can then be formed and shaped by conventional procedures, such as formation into films and filaments, or molding in conventional ways, as by extrusion or by injection molding, or other manipulations demanded by the type and kind of end product desired.

The polyethylene composition may be polyethylene itself or polyethylene containing additives and fillers. The material contemplated herein under the term polyethylene is described in Modern Plastics Encyclopedia, and is also described in Patent 2,153,553, Fawcett et al, April 11, 1939. It has also been suggested to cure these polymer materials by the employment of peroxides, as for instance di(aralkyl) peroxides, particular species being di-t-butyl peroxide, di-alpha cumyl peroxide and t-butyl alpha cumyl peroxide. These peroxides are all monofunctional in contrast to the polyperoxy functional of the crosslinking agent of the present invention.

Polyethylenes of various molecular weights are available on the market, and the types of these polymers are described by Lawton et al. in Industrial and Engineering Chemistry, 46, 1703–1709. Various companies offer commercial polyethylenes and for the purposes of the tests described herein, polyethylene compositions, as sold by E. I. du Pont de Nemours, Inc., Wilmington, Delaware, under the designation Alathon 1, 3, 10, 12, 14, etc., were employed, specifically Alathon 10 and Alathon 3. When the crosslinking agent of the present invention is milled with polyethylene compositions, the milled compositions formed and cured by heat in the neighborhood of 155° C. to 175° C., in the usual manner, end products result which possess increased resistance to deformation under heat, and increased tensile strength, as compared to the uncured polymer, all desirable characteristics tending to increase the field of use of the versatile polyethylenes. The same end results are obtained when the usual fillers are employed.

Polyethylene was readily crosslinked with 2,5-dimethyl-2,5-di(t-butylperoxy) hexane at a 5% weight concentration, the percent insoluble in xylene being 29% in the case of Alathon 10, and 51% in the case of Alathon 3.

The 2,5-dimethyl-2,5-di(t-butylperoxy) hexane is a novel polyfunctional organic peroxide and may be considered as the di-tertiary butyl derivative of 2,5-dimethylhexane-2,5-dihydroperoxide. This new alkyl derivative may be thought of as the reaction product of a molar quantity of the parent dihydroperoxide with 2 molar quantities of the aliphatic alcohol, tertiary butyl alcohol effected through the mechanism, for instance, of the alkyl ester of an inorganic acid such as sulfuric acid.

The following example is given as a specific illustration of preparing the novel 2,5-dimethyl-2,5-di(t-butylperoxy) hexane. The active oxygen content of the final product was determined by accepted standard procedures, as for instance, by potassium iodide thiosulfate titration; by ultimate analysis for carbon and hydrogen; and by molecular refraction. In the illustrative procedure below, the t-butyl alcohol was reacted with the dihydroperoxide although the final product can be prepared by reaction of t-butyl hydroperoxide with the glycol, 2,5-dimethylhexane-2,5-diol.

EXAMPLE 1

*2,5-Dimethyl-2,5-Di(t-Butylperoxy)Hexane*

To 320 g. of 70% sulfuric acid was slowly added 180 g. (2.4 moles) of t-butanol. The reaction temperature was held at 5–10° C. during the 45 minute addition period. To this mixture was added in a single portion, 100 g. (0.56 mole) of the dihydroperoxide. The temperature was allowed to rise to 40° C. and stirring was continued for 5 hours. The product was extracted with ethyl ether, then washed as a solution with dilute sodium bicarbonate and then water. Separation of the ethereal solution, drying over anhydrous magnesium sulfate, filtration and removal of the ether under reduced pressure left a pale yellow oil. Distillation yielded a colorless liquid, boiling point 50–52° C. (0.1 mm.).

$n_D^{28}$ 1.4185 $d_4^{28}$ 0.8728

Calculated for $C_{16}H_{34}O_4$: C, 66.30%; H, 11.73%; $MR_D$ 83.8. Found: C, 66.16%; H, 11.65%; $MR_D$ 84.0.

What is claimed is:

1. The process of crosslinking polyethylene which comprises incorporating in the polyethylene a crosslinking amount of the high molecular weight polyfunctional polypercompound, 2,5-dimethyl-2,5-di(t-butylperoxy)-hexane and heating the mixture until crosslinking occurs.

2. Composition useful in the production of crosslinked polyethylene, consisting essentially of 100 parts by weight of polyethylene and about 0.1 to 10 parts by weight of 2,5-bis(tert-butylperoxy)-2,5-dimethylhexane.

3. Method of crosslinking polyethylene, comprising mixing together 100 parts by weight of polyethylene, and about 0.1 to 10 parts by weight of 2,5-bis(tert-butylperoxy)-2,5-dimethylhexane, and thereafter heating the resulting mixture to effect crosslinking of said polyethylene.

References Cited in the file of this patent
UNITED STATES PATENTS

| | | |
|---|---|---|
| 2,862,973 | Winkler et al. | Dec. 2, 1958 |
| 2,898,377 | Handy et al. | Aug. 4, 1959 |
| 2,913,448 | Tabler | Nov. 17, 1959 |
| 2,916,481 | Gilmont | Dec. 8, 1959 |